(12) United States Patent
Cheeley et al.

(10) Patent No.: US 9,988,586 B2
(45) Date of Patent: Jun. 5, 2018

(54) SYSTEMS AND METHODS FOR THE USE OF FISCHER-TROPSCH TAIL GAS IN A GAS TO LIQUID PROCESS

(71) Applicant: MIDREX TECHNOLOGIES, INC., Charlotte, NC (US)

(72) Inventors: Robert B. Cheeley, Charlotte, NC (US); Gary E. Metius, Charlotte, NC (US); David C. Meissner, Charlotte, NC (US)

(73) Assignee: MIDREX TECHNOLOGIES, INC., Charlotte, NC (US)

( * ) Notice: Subject to any disclaimer, the term of this patent is extended or adjusted under 35 U.S.C. 154(b) by 901 days.

(21) Appl. No.: 13/671,603

(22) Filed: Nov. 8, 2012

(65) Prior Publication Data
US 2013/0116347 A1  May 9, 2013

Related U.S. Application Data

(60) Provisional application No. 61/556,933, filed on Nov. 8, 2011.

(51) Int. Cl.
*B01J 8/04* (2006.01)
*C01B 3/38* (2006.01)
(Continued)

(52) U.S. Cl.
CPC ............... *C10K 3/026* (2013.01); *B01J 7/00* (2013.01); *C01B 3/384* (2013.01); *B01J 8/04* (2013.01); *C01B 2203/0233* (2013.01); *C01B 2203/0238* (2013.01); *C01B 2203/0485* (2013.01); *C01B 2203/062* (2013.01); *C01B 2203/0827* (2013.01); *C01B 2203/0877* (2013.01); *C01B 2203/0883* (2013.01);
(Continued)

(58) Field of Classification Search
None
See application file for complete search history.

(56) References Cited

U.S. PATENT DOCUMENTS 4,631,182 A * 12/1986 Tottrup et al. ............. 423/418.2
4,690,777 A *  9/1987 Valenyi ..................... B01J 23/74
                                                                   252/373

(Continued)

OTHER PUBLICATIONS

Berk, Zeki. Food Process Engineering and Technology. 2009. Discussion of "Process Flow Diagrams", pp. 4-6.*

*Primary Examiner* — Jennifer A Leung
(74) *Attorney, Agent, or Firm* — Clements Bernard Walker PLLC; Christopher L. Bernard

(57) ABSTRACT

The present disclosure provides a Fischer-Tropsch tail gas recycling system, including: a Fischer-Tropsch reactor providing a source of tail gas; a first preheater for preheating the tail gas to between about 200 and 300 degrees C.; a hydrogenator for hydrogenating the tail gas; an expansion device for reducing the pressure of the tail gas to between about 2.5 and 5 bar; a second preheater for preheating a feed gas comprising the tail gas and steam to between about 500 and 600 degrees C.; and a catalytic reformer for reforming the feed gas in the presence of a catalyst, wherein the catalytic reformer operates at about 2 bar and about 1000 degrees C., for example. Optionally, CO2 and/or natural gas are also added to the tail gas and/or steam to form the feed gas.

6 Claims, 1 Drawing Sheet

(51) Int. Cl.
*C10K 3/02* (2006.01)
*B01J 7/00* (2006.01)
*C10G 2/00* (2006.01)

(52) U.S. Cl.
CPC ............ *C01B 2203/0894* (2013.01); *C01B 2203/1058* (2013.01); *C01B 2203/148* (2013.01); *C10G 2/00* (2013.01); *Y02P 20/129* (2015.11)

(56) References Cited

U.S. PATENT DOCUMENTS

| | | | |
|---|---|---|---|
| 5,248,567 A * | 9/1993 | Amemiya et al. | 429/413 |
| 6,392,109 B1 * | 5/2002 | O'Rear et al. | 585/323 |
| 6,696,501 B2 | 2/2004 | Schanke et al. | |
| 7,812,060 B2 * | 10/2010 | Gimpel et al. | 518/726 |
| 2004/0161645 A1 * | 8/2004 | Poschmann et al. | 429/17 |

* cited by examiner

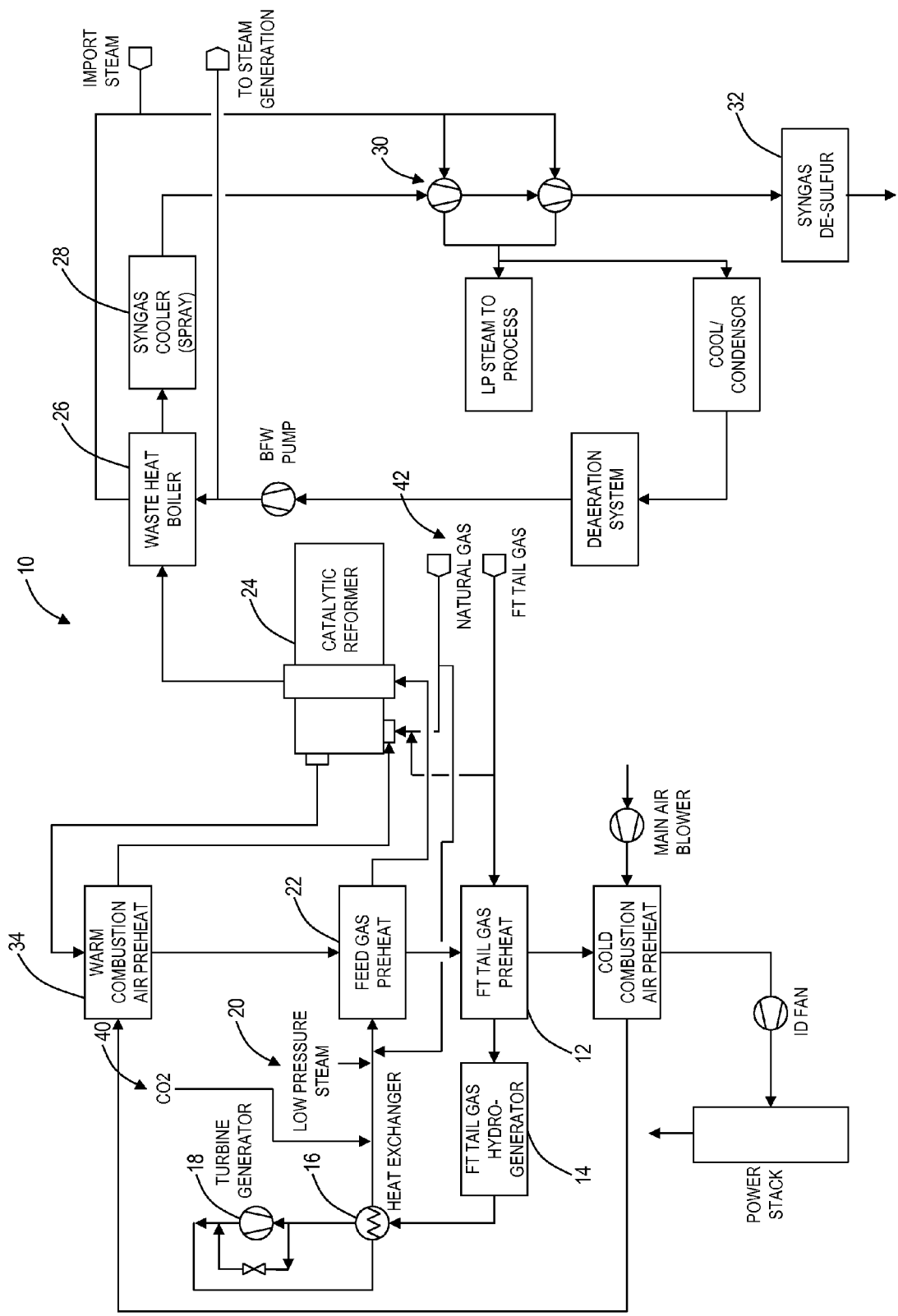

SYSTEMS AND METHODS FOR THE USE OF FISCHER-TROPSCH TAIL GAS IN A GAS TO LIQUID PROCESS

CROSS-REFERENCE TO RELATED APPLICATION

The present patent application/patent claims the benefit of priority of U.S. Provisional Patent Application No. 61/556,933, filed on Nov. 8, 2011, and entitled "SYSTEMS AND METHODS FOR THE USE OF FISCHER-TROPSCH TAIL GAS IN A GAS TO LIQUID PROCESS," the contents of which are incorporated in full by reference herein.

FIELD OF THE DISCLOSURE

The present disclosure relates generally to systems and methods for the use of Fischer-Tropsch (F-T) tail gas in a gas to liquid (GTL) process. More specifically, the present disclosure relates to systems and methods for the use of F-T tail gas in a GTL process that utilize a catalytic reformer or the like at relatively low pressure, thereby reducing carbon soot formation while reforming with $CO_2$, among other advantages.

BACKGROUND OF THE DISCLOSURE

The F-T process for converting natural gas or other gaseous fossil fuels to higher liquid hydrocarbons, well known to those of ordinary skill in the art, requires a synthesis gas of primarily CO and $H_2$. This synthesis gas is typically generated in a steam reformer, auto-thermal reformer (ATR), or the like. ATR involves the reforming of $O_2$, steam, and methane to produce CO and $H_2$. The synthesis gas may also be generated by partially oxidizing natural gas with oxygen. This natural gas may contain some higher or heavy hydrocarbons along with $CO_2$ and $N_2$.

The synthesis gas fed to the F-T process is typically high in CO and $H_2$ after condensing the excess water used in synthesis gas generation. The water vapor is typically near zero at the high pressures (approximately 25 bar) used in the F-T reactor. The residual methane is typically around 1%, which indicates that the synthesis gas generation was efficient and did not allow significant methane slip. The combination of $CO_2$, $N_2$, and $CH_4$ are considered inert in the F-T reaction and, as a consequence, there is not a hard maximum specification. However, the presence of these inerts requires larger reactors and higher total pressures. It is, therefore, important to minimize the inerts, especially the $CO_2$ and $CH_4$, which may be controlled or removed, while the $N_2$ is somewhat fixed by the nitrogen in the feed gas (i.e. natural gas).

The F-T reaction converts $CO+2H_2$ to $—(CH_2)-+H_2O$. The $—(CH_2)-$ forms a chain and acts as a building block for the liquid hydrocarbons. Also exiting the F-T reactor is a tail gas that contains CO, $H_2$, $CO_2$, $H_2O$, $N_2$, $CH_4$, and some heavy hydrocarbons and olefins. Part of the tail gas is typically recycled back to the F-T reactor, with the remainder used as fuel in the plant. Since the tail gas contains significant amounts of CO and $H_2$, it does not make sense to recycle the tail gas back to the ATR, where CO and $H_2$ are first partially oxidized with oxygen to $CO_2$ and $H_2O$.

Burning the tail gas in the plant is a way to prevent nitrogen buildup in the F-T recirculating loop by venting an amount of nitrogen that is equal to the incoming nitrogen in the natural gas and nitrogen associated with the ATR oxygen. However, combusting more than that required for nitrogen elimination is a waste of CO and $H_2$ made in the synthesis gas generation step. This means that either the synthesis gas generator has to be larger, along with the oxygen plant, to make enough CO and $H_2$ for the F-T reactor or that the F-T reactor will make less hydrocarbon liquid.

U.S. Pat. No. 6,696,501 (Schanke et al., Feb. 24, 2004) provides:

A method is described for conversion of natural gas or other fossil fuels to higher hydrocarbons, comprising the following steps: a) reaction of natural gas with steam and oxygenic gas in at least one reforming zone in order to produce a synthesis gas consisting primarily of hydrogen and CO, in addition to some carbon dioxide; b) passing said synthesis gas to a Fischer-Tropsch reactor in order to produce a crude synthesis stream consisting of lower hydrocarbons, water and non-converted synthesis gas; c) separation of said crude synthesis stream in a recovery zone, into a crude product stream mainly containing heavier hydrocarbons, a water stream and a tail gas stream mainly containing the remaining constituents; which is characterized in that the method also comprises the following steps; d) stream reformation of at least part of the tail gas in a separate steam reformer; e) introduction of the reformed tail gas into the gas stream before this is led into the Fischer-Tropsch reactor.

Thus, U.S. Pat. No. 6,696,501 proposes steam reforming the F-T tail gas plus additional natural gas in order to increase carbon efficiency and lower the oxygen consumption of the ATR by reducing the amount of feed gas to the ATR. U.S. Pat. No. 6,696,501 proposes steam reforming at typical steam reforming conditions of 10 to 40 bar (i.e. at high pressures) and a temperature of 850 to 950 degrees C. U.S. Pat. No. 6,696,501 assumes various steam to carbon and $CO_2$ to carbon ratios of 5.3, 1.0, and 0.6. A steam reforming catalyst supplier lists typical steam to carbon ratios of 2.5 to 5.0 for reforming pressures of 15 to 35 bar. Equilibrium calculations with a typical F-T tail gas and the various conditions provided in the patent demonstrate that at steam to carbon and $CO_2$ to carbon ratios of 5.0, the $CO_2$ in the reformed gas is 27% at 10 bar. The calculations also demonstrate that at steam to carbon and $CO_2$ to carbon ratios of 1.0, the $CO_2$ and $CH_4$ in the reformed gas are 9% and 4.7%, respectively, at 25 bar. The calculations further demonstrate that operation at steam to carbon and $CO_2$ to carbon ratios of 0.6, carbon soot forms in the reformer at pressures above 15 bar. This is, of course, problematic.

BRIEF SUMMARY OF THE DISCLOSURE

In various exemplary embodiments, the systems and methods of the present disclosure circumvent the problems of low quality gas and carbon soot formation by purposefully operating the reformer at much lower pressures of about 2 bar, and higher operating temperatures in excess of about 1000 degrees C. These conditions, with carefully selected steam to carbon and $CO_2$ to carbon ratios of about 0.92 and 0.97, respectively, produce high quality gas with low methane leakage and zero carbon soot in the reformer. This is a new approach to those of ordinary skill in the art.

Importantly, the systems and methods of the present disclosure preserve the CO and $H_2$ in the tail gas, and convert the $CH_4$ in the tail gas by reforming it with the $CO_2$ in the tail gas, plus some additional $H_2O$ to make up for any $CO_2$ deficiency. Advantageously, the systems and methods of the present disclosure are capable of reforming all of the tail gas that is available after venting a portion of the tail gas to control or eliminate any N2 buildup, as necessary.

Advantageously, all hydrocarbons in the tail gas are reformed (CH4 to C6H14) with the contained CO2 and any necessary additional water. Tail gas containing large amounts of CO is reformed without special precautions. Reforming is accomplished at a purposefully selected low pressure (approximately 2 bar) and a high temperature (approximately 1000 degrees C.). Reforming is accomplished at near stoichiometric ratios of CO2/C and H2O/C, which provides a synthesis gas with low CH4 slip (i.e. less than 1%), low CO2, low H2O, and high CO and H2. The reductant to oxidant ratio (H2+CO)/(H2O+CO2) is in excess of 5.0 in the hot synthesis gas before any cooling. The H2/CO ratio of the synthesis gas may be adjusted, if desired, by adding and/or removing, oxidants of CO2 and H2O. In another embodiment, additional hydrocarbons may be added to match the oxidants. CO2 in the tail gas is consumed, and not vented to the atmosphere as with conventional systems and methods, making the process "greener." Any venting of tail gas for nitrogen control may be used in the reformer burners, for example. The reformer is operated such that carbon soot deposits are avoided during reforming. After compression and desulfurization, the synthesis gas may be added directly to the F-T reactor feed.

In one exemplary embodiment, the present disclosure provides a Fischer-Tropsch tail gas recycling system, including: a Fischer-Tropsch reactor providing a source of tail gas; a first preheater for preheating the tail gas to between about 200 and 300 degrees C.; a hydrogenator for hydrogenating the tail gas; an expansion device for reducing the pressure of the tail gas to between about 2.5 and 5 bar (preferably between about 3 and 5 bar); a second preheater for preheating a feed gas comprising the tail gas and steam to between about 500 and 600 degrees C.; and a catalytic reformer for reforming the feed gas in the presence of a catalyst. The hydrogenator converts any olefins in the tail gas to saturated hydrocarbons. The system also includes a low pressure steam source in fluid communication with the tail gas between the expansion device and the second preheater. Optionally, the catalyst is nickel. Preferably, the catalytic reformer operates at about 2 bar and about 1000 degrees C. The system further includes a waste heat boiler for cooling synthesis gas exiting the catalytic reformer. The system still further includes a direct contact water spray cooler for cooling synthesis gas exiting the catalytic reformer. The system still further includes a compression device for increasing the pressure of synthesis gas exiting the catalytic reformer. The system still further includes a packed bed desulfurization unit for desulfurizing the synthesis gas. Finally, the system includes a conduit for delivering the desulfurized synthesis gas back to the Fischer-Tropsch reactor. Optionally, CO2 and/or natural gas are also added to the tail gas and/or steam to form the feed gas.

In another exemplary embodiment, the present disclosure provides a Fischer-Tropsch tail gas recycling method, including: providing a Fischer-Tropsch reactor providing a source of tail gas; providing a first preheater for preheating the tail gas to between about 200 and 300 degrees C.; providing a hydrogenator for hydrogenating the tail gas; providing an expansion device for reducing the pressure of the tail gas to between about 2.5 and 5 bar (preferably between about 3 and 5 bar); providing a second preheater for preheating a feed gas comprising the tail gas and steam to between about 500 and 600 degrees C.; and providing a catalytic reformer for reforming the feed gas in the presence of a catalyst. The hydrogenator converts any olefins in the tail gas to saturated hydrocarbons. The method also includes providing a low pressure steam source in fluid communication with the tail gas between the expansion device and the second preheater. Optionally, the catalyst is nickel. Preferably, the catalytic reformer operates at about 2 bar and about 1000 degrees C. The method further includes providing a waste heat boiler for cooling synthesis gas exiting the catalytic reformer. The method still further includes providing a direct contact water spray cooler for cooling synthesis gas exiting the catalytic reformer. The method still further includes providing a compression device for increasing the pressure of synthesis gas exiting the catalytic reformer. The method still further includes providing a packed bed desulfurization unit for desulfurizing the synthesis gas. Finally, the method includes providing a conduit for delivering the desulfurized synthesis gas back to the Fischer-Tropsch reactor. Optionally, CO2 and/or natural gas are also added to the tail gas and/or steam to form the feed gas.

In a further exemplary embodiment, the present disclosure provides a Fischer-Tropsch tail gas recycling system, including: a Fischer-Tropsch reactor providing a source of tail gas; a first preheater for preheating the tail gas; a hydrogenator for hydrogenating the tail gas; an expansion device for reducing the pressure of the tail gas; a second preheater for preheating a feed gas comprising the tail gas and steam; and a Midrex reformer for reforming the feed gas in the presence of a catalyst. Preferably, the first preheater preheats the tail gas to between about 200 and 300 degrees C., the expansion device reduces the pressure of the tail gas to between about 2.5 and 5 bar (preferably between about 3 and 5 bar), and the second preheater preheats the feed gas to between about 500 and 600 degrees C. Preferably, the catalytic reformer operates at about 2 bar and about 1000 degrees C. Optionally, CO2 and/or natural gas are also added to the tail gas and/or steam to form the feed gas.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a schematic diagram illustrating one exemplary embodiment of a system and method for the use of F-T tail gas in a GTL process in accordance with the present disclosure.

DETAILED DESCRIPTION OF THE DISCLOSURE

Again, in various exemplary embodiments, the systems and methods of the present disclosure circumvent the problems of low quality gas and carbon soot formation by purposefully operating the reformer at much lower pressures of about 2 bar, and higher operating temperatures in excess of about 1000 degrees C. These conditions, with carefully selected steam to carbon and CO2 to carbon ratios of about 0.92 and 0.97, respectively, produce high quality gas with low methane leakage and zero carbon soot in the reformer. This is a new approach to those of ordinary skill in the art.

Importantly, the systems and methods of the present disclosure preserve the CO and H2 in the tail gas, and convert the CH4 in the tail gas by reforming it with the CO2 in the tail gas, plus some additional H2O to make up for any CO2 deficiency. Advantageously, the systems and methods of the present disclosure are capable of reforming all of the tail gas that is available after venting a portion of the tail gas to control or eliminate any N2 buildup.

Advantageously, all hydrocarbons in the tail gas are reformed (CH4 to C6H14) with the contained CO2 and any necessary additional water. Tail gas containing large amounts of CO is reformed without special precautions. Reforming is accomplished at a purposefully selected low pressure (approximately 2 bar) and a high temperature (approximately 1000 degrees C.). Reforming is accomplished at near stoichiometric ratios of CO2/C and H2O/C, which provides a synthesis gas with low CH4 slip (i.e. less than 1%), low CO2, low H2O, and high CO and H2. The reductant to oxidant ratio (H2+CO)/(H2O+CO2) is in excess of 5.0 in the hot synthesis gas before any cooling. The H2/CO ratio of the synthesis gas may be adjusted, if desired, by adding and/or removing, oxidants of CO2 and H2O. In another embodiment, additional hydrocarbons may be added to match the oxidants. Advantageously, CO2 in the tail gas is consumed, and not vented to the atmosphere, making the process "greener." Any venting of tail gas for nitrogen control may be used in the reformer burners, for example. The reformer is operated such that carbon soot deposits are avoided during reforming. After compression and desulfurization, the synthesis gas may be added directly to the F-T reactor feed.

Referring now specifically to FIG. 1, in one exemplary embodiment, the F-T tail gas recycling system/method 10 of the present disclosure includes preheating the F-T tail gas to between about 200 and 250 degrees C. in a preheater 12 before delivering the F-T tail gas to a hydrogeneration unit 14 that converts any olefins to saturated hydrocarbons. From the hydrogeneration unit 14, the F-T tail gas is delivered to a heat exchanger 16 and a turbine generator 18 or other pressure reduction device in order to reduce its pressure to between about 2 and 3 bar. From there, some low pressure steam 20 may be added before the F-T tail gas (now a feed gas with the addition of the steam 20) is delivered to a feed gas preheater 22, which heats the gas mixture to about 550 degrees C. Optionally, in another embodiment, CO2 40 and/or natural gas 42 are also added to the F-T tail gas/feed gas at this stage. Next, the gas mixture is delivered to a catalytic reformer 24, well known to those of ordinary skill in the art, where the gas mixture is reformed over a catalyst, such as nickel or the like. Preferably, reforming takes place at about 2 bar (with an exemplary range of between about 1.5 and 3 bar) and 1000 degrees C. (with an exemplary range of between about 900 and 1150 degrees C.) in tubes filled with the catalyst. After reforming, the hot synthesis gas is cooled in a waste heat boiler 26 and a direct contact water spray cooler 28 or the like. The synthesis gas is then compressed to F-T operating pressures in one or more compressors 30 before flowing to a packed bed desulfurization unit 32 or the like. After desulfurization, the synthesis gas is delivered to the F-T reactor feed, as is generally then well known to those of ordinary skill in the art. The waste heat boiler 26 raises steam that is used for compression of the synthesis gas in the one or more compressors 30. Flue gas from the reformer 24 is utilized for preheating the combustion air to the reformer 24 via the warm combustion air preheater 34, preheating the feed gas to the reformer 24 that is reformed, and preheating the F-T tail gas prior to hydrogeneration in the preheater 12.

The systems and methods of the present disclosure thereby circumvent the problems of low quality gas and carbon soot formation by purposefully operating the reformer at much lower pressures of about 2 bar, and higher operating temperatures in excess of about 1000 degrees C. These conditions, with carefully selected steam to carbon and CO2 to carbon ratios of about 0.92 and 0.97, respectively, produce high quality gas with low methane leakage and zero carbon soot in the reformer.

The systems and methods of the present disclosure preserve the CO and H2 in the tail gas, and convert the CH4 in the tail gas by reforming it with the CO2 in the tail gas, plus some additional H2O to make up for any CO2 deficiency. The systems and methods of the present disclosure are capable of reforming all of the tail gas that is available after venting a portion of the tail gas to control or eliminate any N2 buildup.

All hydrocarbons in the tail gas are reformed (CH4 to C6H14) with the contained CO2 and any necessary additional water. Tail gas containing large amounts of CO is reformed without special precautions. Reforming is accomplished at a purposefully selected low pressure (approximately 2 bar) and a high temperature (approximately 1000 degrees C.). Reforming is accomplished at near stoichiometric ratios of CO2/C and H2O/C, which provides a synthesis gas with low CH4 slip (i.e. less than 1%), low CO2, low H2O, and high CO and H2. The reductant to oxidant ratio (H2+CO)/(H2O+CO2) is in excess of 5.0 in the hot synthesis gas before any cooling. The H2/CO ratio of the synthesis gas may be adjusted, if desired, by adding and/or removing, oxidants of CO2 and H2O. In another embodiment, additional hydrocarbons may be added to match the oxidants. CO2 in the tail gas is consumed, and not vented to the atmosphere, making the process "greener." Any venting of tail gas for nitrogen control may be used in the reformer burners, for example. The reformer is operated such that carbon soot deposits are avoided during reforming. After compression and desulfurization, the synthesis gas may be added directly to the F-T reactor feed.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Fischer-Tropsch tail gas recycling system, comprising:
   a Fischer-Tropsch reactor providing a source of tail gas;
   a first preheater for preheating the tail gas;
   a hydrogenator for hydrogenating the tail gas;
   an expansion device for reducing the pressure of the tail gas;
   a second preheater for preheating a feed gas comprising the tail gas and steam;
   a catalytic reformer for reforming the feed gas in the presence of a catalyst;
   wherein the first preheater is disposed between the Fischer-Tropsch reactor and the hydrogenator and the second preheater is disposed between the hydrogenator and the catalytic reformer; and
   a CO2 source for providing CO2 in fluid communication with the tail/feed gas between the hydrogenator and the second preheater;
   wherein a majority of the tail gas from the Fischer-Tropsch reactor is delivered to the hydrogenator, with the exception of an amount vented to control nitrogen buildup in the system; and wherein the catalytic reformer operates at about 2 bar and about 1000 degrees C. with a steam to carbon ratio of about 0.92 and a CO2 to carbon ratio of about 0.97 to prevent CH4 leakage and carbon soot formation; and a waste heat boiler, a direct contact water spray cooler, a compression device, and a a packed bed desulfurization unit for cooling, compressing, and desulfurizing synthesis gas exiting the catalytic reformer and a conduit for delivering the cooled, compressed, and desulfurized synthesis gas back to the Fischer-Tropsch reactor.

2. The tail gas recycling system of claim 1, wherein the first preheater preheats the tail gas to between about 200 and 300 degrees C., the expansion device reduces the pressure of the tail gas to between about 2.5 and 5 bar, and the second preheater preheats the feed gas to between about 500 and 600 degrees C.

3. The tail gas recycling system of claim 1, wherein the hydrogenator converts any olefins in the tail gas to saturated hydrocarbons.

4. The tail gas recycling system of claim 1, further comprising a low pressure steam source in fluid communication with the tail gas between the expansion device and the second preheater.

5. The tail gas recycling system of claim 1, wherein the catalyst comprises nickel.

6. The tail gas recycling system of claim 1, further comprising one or more of a natural gas source for providing natural gas and a steam source for providing steam in fluid communication with the tail/feed gas between the hydrogenator and the second preheater.

* * * * *